United States Patent
Erdmann et al.

(10) Patent No.: US 9,036,531 B2
(45) Date of Patent: May 19, 2015

(54) WIRELESS COMMUNICATION METHOD BASED ON PROXY REDUNDANCY

(75) Inventors: Bozena Erdmann, Aachen (DE); Ludovicus Marinus Gerardus Maria Tolhuizen, Waalre (NL); Wei Yuan, The Hague (NL)

(73) Assignee: Koninklijkle Philips N.V., Eindhoven (NL)

( * ) Notice: Subject to any disclaimer, the term of this patent is extended or adjusted under 35 U.S.C. 154(b) by 214 days.

(21) Appl. No.: 13/512,425

(22) PCT Filed: Nov. 30, 2010

(86) PCT No.: PCT/IB2010/055501
§ 371 (c)(1),
(2), (4) Date: May 29, 2012

(87) PCT Pub. No.: WO2011/070479
PCT Pub. Date: Jun. 16, 2011

(65) Prior Publication Data
US 2012/0236778 A1  Sep. 20, 2012

(30) Foreign Application Priority Data
Dec. 9, 2009 (EP) .................... 09306201

(51) Int. Cl.
*H04W 40/10* (2009.01)
*H04W 88/18* (2009.01)
(Continued)

(52) U.S. Cl.
CPC ............ *H04W 40/10* (2013.01); *H04W 88/182* (2013.01); *H04L 45/22* (2013.01); *H04W 84/18* (2013.01)

(58) Field of Classification Search
CPC .... H04W 40/10; H04W 84/18; H04W 88/182
See application file for complete search history.

(56) References Cited

U.S. PATENT DOCUMENTS

2005/0058085 A1* 3/2005 Shapiro et al. ................ 370/256
2005/0180447 A1* 8/2005 Lim et al. ...................... 370/432
(Continued)

FOREIGN PATENT DOCUMENTS

CN   101282605 A   10/2008
CN   101287324 A   10/2008
(Continued)

OTHER PUBLICATIONS

Hyoung Seok Lim et al; "Efficient Data Gathering Mechanicsm for Mobile Sink Node in Zigbee Network", Inf. Networking, 2008, ICOIN 2008, Intnl Conf. on, IEEE, Piscataway, NJ, Jan. 23, 2008, pp. 1-5, XP31238821

*Primary Examiner* — Min Jung
(74) *Attorney, Agent, or Firm* — Meenakshy Chakravorty (57) ABSTRACT

A method for wireless communication in a network comprising a resource-restricted device (ZGPD), at least two proxy devices (ZP1, ZP2) and at least one destination device (DD), wherein the method comprises the following steps: the resource-restriced device transmitting a frame to be forwarded to a destination device in the network, said frame containing a unique source identifier of the resource-restricted device, at least one proxy device receiving the frame and identifying the frame as originating from a resource-restricted device, —the proxy device determining the unique source identifier and deriving a group identifier as a known function of the unique source identifier, the group identifier designating a group of devices in the network or a source address, the proxy constructing, from the frame, an appropriate packet to be forwarded, the proxy forwarding the packet by taking into account the group identifier.

13 Claims, 1 Drawing Sheet (51) Int. Cl.
*H04L 12/707* (2013.01)
*H04W 84/18* (2009.01)

(56) References Cited

U.S. PATENT DOCUMENTS

| | | | |
|---|---|---|---|
| 2006/0154598 A1* | 7/2006 | Rudland et al. | 455/3.01 |
| 2006/0274671 A1* | 12/2006 | Budampati et al. | 370/254 |
| 2007/0121529 A1* | 5/2007 | Meier | 370/256 |
| 2008/0205385 A1* | 8/2008 | Zeng et al. | 370/389 |
| 2008/0316951 A1* | 12/2008 | Zeng et al. | 370/312 |
| 2009/0201844 A1* | 8/2009 | Bhatti et al. | 370/312 |
| 2011/0294431 A1* | 12/2011 | Erdmann et al. | 455/41.2 |
| 2013/0131882 A1* | 5/2013 | Verfuerth et al. | 700/295 |

FOREIGN PATENT DOCUMENTS

| | | |
|---|---|---|
| CN | 101370334 A | 2/2009 |
| WO | 2004109974 A1 | 12/2004 |
| WO | 2008027615 A1 | 3/2008 |

* cited by examiner

WIRELESS COMMUNICATION METHOD BASED ON PROXY REDUNDANCY

FIELD OF THE INVENTION

The present invention relates to a method for communication in a wireless control network. More particularly, the present invention relates to a method for ensuring maintenance of correct communication between a communication device and a destination device in a wireless network.

This invention is, for example, relevant for wireless networks comprising resource-restricted devices having low power resources. In a specific application, the present invention is relevant for wireless networks using communication protocols compliant with the IEEE802.15.4 and also IEEE802.15.4-based protocols, e.g. ZigBee protocol, especially the ZigBee Green Power protocol.

BACKGROUND OF THE INVENTION

Wireless control networks have recently become a ubiquitous trend in the field of communication and connectivity/automation, especially for building management systems. Wireless technologies present major advantages in terms of freedom of device placement, device portability, and installation cost reduction, since there is no need for drawing cables and drilling. Thus, such technologies are particularly attractive for interconnecting, sensing, automation, control or monitoring systems using sensor devices such as light switches, light dimmers, wireless remote controllers, movement or light detectors, window or door openers, that have to be set up in distant places one from the other and from the devices they control, e.g. lights.

One of the drawbacks appearing in networks of the like relates to device powering. Indeed, since the devices are not wired, they can not receive power necessary for performing all the operations required in the network from the mains or via the connection with the controller. Thus, it has been envisaged to equip such devices with built-in batteries. However, since the devices are quite size-restricted, batteries may not be of a large size, which results either in a reduced device lifetime, or in labour intensive battery replacement.

It has been suggested to remedy this issue by equipping sensor devices with self-sustained energy sources that harvest energy from its environment or from the interaction with the user. Still, the amount of energy achievable by off-the-shelf energy harvesters is very limited, which means that the features and functions of the resource-restricted devices are heavily restricted.

Among the functions that are mandatory for good operation in a wireless network is the maintenance of correct communication, which makes it possible to ensure at any time that a resource-restricted device is linked to a router, also called proxy, which forwards messages on its behalf. In existing implementations therefore, a parent-child relationship is established between a device, generally resource-restricted, and its parent router. The child end device addresses all its communication to the parent for being forwarded to its final destination. However, especially in case of energy-harvesting device, this relationship creates a single point of failure in the network, because if the parent link is broken, communication from the end device can not be successfully performed anymore.

Several solutions have been suggested to remedy this problem, using proxy redundancy. A first type of solution aims at ensuring that, at any given time, one and only one proxy is forwarding frames on behalf of the resource-restricted device to the destination. However, the existing procedures of the like involve, for guaranteeing proxy redundancy, a large amount of additional communication, a large amount of additional proxy code, and considerable delay when a device moves in the network. Moreover, in these procedures, some prior master proxies may remain undiscovered, thus leading to many master conflicts.

SUMMARY OF THE INVENTION

It is an object of the invention to propose a method for wireless communication in a network allowing the use of proxy redundancy while overcoming at least some of the above-mentioned drawbacks.

More precisely, it is an object of the invention to propose a method for wireless communication wherein the amount of communication between different proxy devices in the network is reduced.

Yet another object of the invention is to provide a method allowing master proxy election.

To this end, the invention relates to a method for wireless communication in a network comprising a resource-restricted device, at least two proxy devices and at least one destination device, wherein the method comprises the following steps:
  the resource-restriced device transmitting a frame to be forwarded to a destination device in the network, said frame containing a unique source identifier of the resource-restricted device,
  at least one proxy device receiving the frame and identifying the frame as originating from a resource-restricted device,
  the proxy device determining the unique source identifier and deriving a group identifier as a known function of the unique source identifier, the group identifier designating a group of devices in the network,
  if the proxy was not yet a member of the group identified by the derived group identifier: the proxy becoming a member of the group with the derived group identifier;
  the proxy constructing, from the frame, an appropriate packet to be forwarded, the proxy forwarding the packet by taking into account the group identifier.

Within the meaning of the invention a resource-restricted device relates to a communicating device that is restricted at least in terms of energy-resource, acting as a reduced functionality device in the network. This formulation includes, but is not limited to, battery-powered devices with limited energy storage and energy-harvesting devices.

A resource-restricted device is, for example, a light switch, a light sensor, a presence detector, or any device of the like used in control networks requiring high link reliability, such as lighting control networks, building or home automation network. The energy harvesting may be performed using electro-mechanical element, e.g. operated by the user; solar cells, or harvesting vibration, thermal, flow or other types of energy.

A proxy device, also called a router in the present specification, is a device having proxy capabilities, corresponding to capacities of routing messages received from an originating device to a destination device. Furthermore, proxy device has the capabilities of receiving the frames sent by the resource-restricted device and acting upon them.

A destination device within the meaning of the present invention is a device for which a frame is intended in the network. Such a device can be a resource-restricted device, a proxy device, or any other type of device, with or without proxy capabilities.

A method according to the invention allows all proxies to independently derive the same multicast identifier from the unique source identifier of the resource-restricted device, using a known function.

In a first embodiment, the group identified by the identifier is a proxy maintenance group. The proxy maintenance group identifier (PGroupID) is used for proxy maintenance communication, thus allowing for reaching all interested parties and providing the keepalive feature between the proxies for free. The group comprises proxy devices involved in forwarding the frames on behalf of a resource-restricted device and the packet constructed from the frame is a notification packet for the master proxy device. In such an embodiment, in case the proxy receiving the frame is not a member of the group identified by the group identifier, then the proxy becomes a member of the group and starts a master proxy resolution procedure for determining a master proxy. Such a procedure is performed by sending a master request message to the group identified by the group identifier.

Then, as soon as the master proxy resolution procedure has been performed, the determined master proxy receives information on the destination devices, derives a packet from the frame sent by the resource-restricted device, determines a destination addressing mode, and forwards the packet by using the determined destination addressing mode.

The destination addressing mode is, for example, unicast or multicast. The information regarding the destination devices is received by the elected master proxy via a configuration procedure, or from an older master proxy.

In a second embodiment, the group designated by the identifier is a control group, comprising target devices, i.e. destination devices for which the frame sent by the resource-restricted device is intended. The Control group identifier (CGroupID) is used for multicast-based application control, allowing the proxies not to care about holding, maintaining and exchanging binding information, i.e. information about the destination devices, thus guaranteeing that resource-restricted device can immediately be operated at any location, without any delay, and thus supporting portability and mobility of resource-restricted device. In such an embodiment, the step of constructing the packet to be forwarded further comprises using a sequence number supplied by the resource-restricted device. The packet constructed from the frame is a data or command packet for the destination device(s), and is forwarded to the identified group.

In a preferred configuration of a method according to the invention, the resource-restricted device has a unique source identifier (SrcID), and the proxies are provided with predetermined functions f1 and f2. Thus, the proxies have the capability to derive the control group identifier as CGroupID=f1(SrcID) and the proxy maintenance group identifier as PGroupID=f2(SrcID). In addition, the proxies have the capability, when located in the range of a resource-restricted device, to recognize frames as being sent by the resource-restricted device. For example, this recognition can be performed thanks to a special frame format used by the resource-restricted device, and identified by the proxy devices.

In one embodiment, the method comprises the step for the proxy device of scheduling the packet forwarding after a predetermined delay, wherein the delay is determined based on one or several of the following criteria: a link quality indicator of the reception of the resource-restricted device's frame, a reception success rate of the resource-restricted device's frame, a memory availability, the fact of being early to forward in the past, the knowledge of the destination device(s), the knowledge of the route to the destination device(s), and the path cost to the destination(s).

In another embodiment, the method comprises the step for the proxy device of listening, during the countdown, if a message corresponding to the same frame is being transmitted by other devices of the network, and if so, of forwarding this message and cancelling its own scheduled transmission or re-transmission.

Another aspect of the invention relates to a method for wireless communication in a network comprising a resource-restricted device, at least two proxy devices, and at least one destination device, wherein the method comprises the following steps:

the resource-restricted device transmitting a frame to be forwarded to a destination device in the network, said frame containing a unique source identifier of the resource-restricted device, at least one proxy device receiving the frame and identifying the frame as originating from a resource-restricted device, the proxy device determining the unique source identifier and deriving a group identifier as a known function of the unique source identifier, the group identifier designating a source address to be used by a group of proxy devices in the network, the proxy constructing, from the frame, an appropriate packet to be forwarded to the destination device(s), using the derived group identifier as a group source address and using a sequence number supplied by the resource-restricted device, the proxy scheduling forwarding the frame to destination device(s) after a predetermined delay, wherein the delay is determined based on one or several criteria comprised in the group comprising a link quality indicator of the resource-restricted device's frame, a reception success rate of the resource-restricted device's frame, a memory availability, the knowledge of the destination device(s), the knowledge of the route to the destination device(s). the fact of being early to forward in the past, the proxy device listening, during the countdown of the delay, if a message corresponding to the same frame is being forwarded by other devices of the network, and if so, of forwarding this message and cancelling its own scheduled transmission.

In one embodiment, this method comprises the step of the destination device receiving the packet and sending an acknowledgement frame to the group identifier contained in the source address field of the received packet, using non-member multicast mode.

In another embodiment, this method comprises the step of a first proxy device being member of the source proxy group, receiving an acknowledgement in non-member mode, forwarding it in member-mode to the source proxy group, and second proxy device receiving the acknowledgement in the member-mode multicast and dropping the scheduled transmission or forwarding of the packet corresponding to this acknowledgement.

These and other aspects of the invention will be apparent from and will be elucidated with reference to the embodiments described hereinafter.

DETAILED DESCRIPTION OF THE INVENTION

Figure 1:
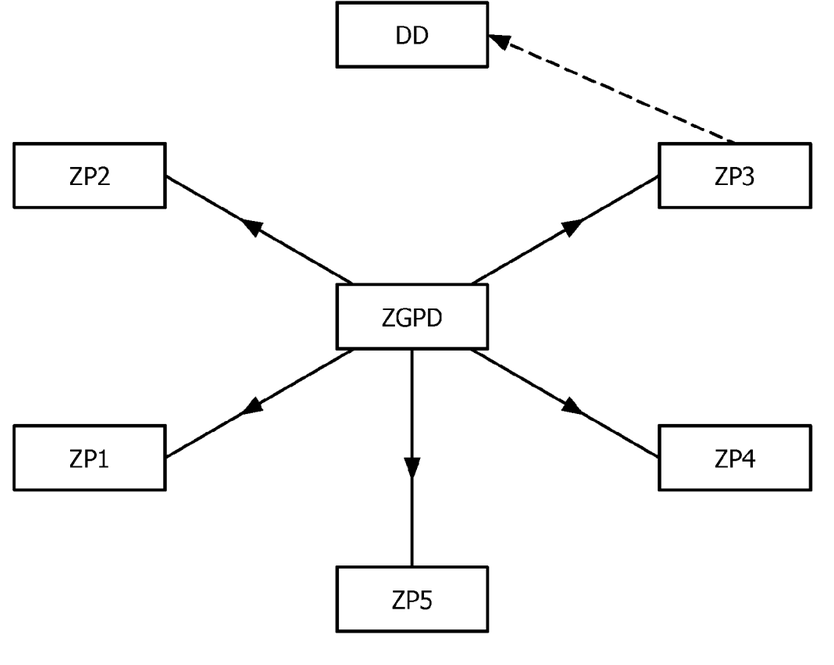
The sole FIGURE depicts a ZigBee network.

The present invention relates to a method for wireless communication in a network comprising a resource-restricted device, at least two proxy devices and at least one destination device. This invention will now be described in detail, without limiting the scope of the invention as defined in the claims.

The resource-restricted device is, for example, an energy-harvesting device, or a ZigBee Green Power device (ZGPD), using a dedicated frame format for sending frames (ZGP frame). The proxy devices (ZP1, ZP2, ZP3, ZP4 and ZP5) are, for example, devices having the capability of understanding such dedicated frame format, and of generating frames compliant with the ZigBee standard (ZB frames) from a ZGP frame. The destination device (DD) is controlled by the resource-restricted device, and has the capability to support the ZB format. For example, a destination device might be a device fully compliant with the ZigBee specification. In another embodiment, a destination device has, in addition, proxy capability, i.e. it can receive ZGP frames and/or ZGP proxy messages.

The resource-restricted device has a unique identifier, which is, for example, distinct from an IEEE address and from a ZigBee network address. The size of the identifier is preferably comprised between 1 and 4 bytes.

Moreover, the resource-restricted frame, i.e. the frame sent by the resource-restricted device contains a sequence number in the MAC header. In an example, this sequence number is not incremental, which means that there is no need for the resource-restricted device to reserve energy to store it in a non-volatile way. Moreover, the packet derived from the resource-restricted frame contains a sequence number, either in the network or application layer, allowing the receiving device to check message freshness and/or to filter duplicate messages.

In the simple embodiment described above, where solely the CGroupID is being used, it can happen that proxies still keep forwarding the resource-restricted frame to the master proxy, although the master proxy already received and forwarded the resource-restricted frame. This adds to unnecessary medium occupation. It can also happen that several proxies forward the resource-restricted packet to the destination at approximately the same time, i.e. before the other simultaneously forwarding proxies can notice.

These drawbacks can be avoided by advantageously combining both embodiments previously described, i.e. the one using the PGroupID and the one using the CGroupID. The selected proxy master uses the CGroupID to forward the data to the destinations using the CGroupID, and all redundancy proxies drop scheduled resource-restricted packet transmission, as soon as they see the master forwarding the resource-restricted packet as a ZigBee packet to the destination(s), and drop the scheduled master notification as soon as they see some other proxy forwarding the resource-restricted packet to the master or as soon as they see the master forwarding the resource-restricted packet as a ZigBee packet to the destination. In this case, it is possible that f1=f2, i.e. PGroupID=CGroupID. It may be beneficial, to keep them separate, as it may allow for different handling already on NWK layer.

A first procedure will now be described in detail, in the case where a proxy sees a packet from a yet unknown resource-restricted device, and wherein it derives a proxy maintenance group identifier from the frame and uses it to forward the resource-restricted device's frame to a master proxy, and wherein the mater proxy then uses a control group identifier for communicating the packet to the destination device. The destination does not necessarily have proxy capabilities. This first procedure comprises, in an exemplary embodiment, the following steps:

Step 1: the resource-restricted device is triggered by external means, such as a user interaction or a sensor, or by internal means such as an internal timer. The device thus sends a ZGPD frame, containing data or command. This frame is sent with the MAC layer using a generic Personal Area Network Identifier (PANId), such as broadcast PANId or a special PANId dedicated for ZGP communication, and MAC broadcast Destination Address. In this case, the MAC layer header contains a random number within the sequence number field. The frame further contains unique a 4 bytes source identifier of the resource-restricted device and a sequence number.

Step 2: All devices with proxy capabilities situated in the network in the radio range of the resource-restricted device identify the frame as being sent by a resource-restricted device and each of them checks whether the resource-restricted device is already known to it. This checking is performed by first deriving a proxy maintenance group identifier by applying a known function to the source identifier, and then by searching for the group identifier in a table, either the nwkGroupIDTable or the apsGroupTable.

Step 3: each proxy that does not find the group ID dervied from the source identifier of the resource-restricted device in an appropriate table adds itself to the group by including the PGroupID in the table. Inclusion into nwkGroupIDTable enables usage of NWK layer member-mode multicast; inclusion into apsGroupTable enables usage of application layer multicast a.k.a. groupcast.

Step 4: each proxy device which just became member of this PGroupID, i.e. which does not yet have the information about the master proxy for this particular resource-restricted device, starts a master election procedure, by sending a Master_request packet comprising at least the source identifier of the resource-restricted device, to the PGroupID.

Step 5: the newly elected master chooses a network-wide unique control GroupID, CGroupID to be controlled by ZigBee cluster derived from the ZGPD, and waits for commissioning to be performed locally on the master proxy or else for the binding information to be distributed in the PGroupID/network-wide broadcast Step 6: in the case where the resource-restricted device was known, it means that the master proxy having to forward the packet is known as well; thus, each proxy except the master proxy constructs a Master_notification packet to notify the master proxy of the ZGPD frame, the packet comprising as payload the relevant contents of the ZGPD frame (such as source identifier of the resource-restricted device, sequence number from the ZGPD frame, the application layer payload from the ZGOD frame), the packet being addressed to this PGroupID, and the packet being sent using the individual source address and sequence number of the forwarding proxy device, to allow the master proxy to treat each notification sent as separate packet. Each proxy schedules the Master_notification packet forwarding, with a delay as a function of one or several parameters among: a link quality indicator for reception of the ZGPD frame, the success rate of the reception of the ZGPD frames, and the fact of being early to forward in the past.

Step 7: During the timeout, i.e. the time before forwarding the packet, the proxy listens to incoming frames: if the proxy receives a Master_notification packet in member mode on PGroup ID, it forwards it according to member mode multicast rules to the PGroupID, and and drops the scheduled transmissions of Master_notification, as well as any packet to any binding destination resulting from the same SrcID and sequence number.

Step 8: After the timeout, the proxy sends the packet constructed as described above to the PGroupID and starts a timer. If no Master_Notification_response is received until timeout, master re-election has to be started.

Step 9: The master proxy receives the ZGPD frame or the Master_notification packet and constructs ZigBee frame to be sent to the controlled destination device(s). The frame is built by using the control group identifier as non-member mode multicast or groupcast destination, the own source address of the master proxy, and the own sequence number of the master proxy, and it contains the command or data derived from the application layer payload of the ZGPD frame.

Step 10: The master proxy forwards the packet to the CGroupID and constructs a Master_Notification_response packet, to be sent to the PGroupID with the source address of the master, and ignores subsequent notifications related to the same ZGPD packet and ZGPD packet repetitions (to be identified by the ZGPD SrcID and ZGPD sequence number).

Step 11: The destination receives the ZGPD frame via the master only, so no duplicate detection should be required.

A second procedure will now be described, where no master proxy is elected, in order to avoid proxy communication overhead and the point of failure introduced by the special role of the proxy. Further, in the case it is assumed, that applications of the network require reliable unicast communication, as well as duplicate filtering at the destination(s). The destination is not required to have proxy capabilities. In this case, when a proxy receives a packet from yet unknown resource-restricted device, it derives the proxy maintenance GroupID (PGroupID), forwards the resource-restricted device's frame to the destination(s), using aliasing, and the destination sends back an acknowledgment message to the alias, which is then distributed in the PGroupID. This second procedure comprises the following steps, wherein steps 1 to 3 are similar to those of the procedure previously described:

Step 1: the resource-restricted device is triggered by external means, such as a user interaction or a sensor, or by internal means such as an internal timer. The device thus sends a ZGPD frame, containing data or command. This frame is sent with the MAC layer using a generic Personal Area Network Identifier (PANId), such as broadcast PANId or a special PANId dedicated for ZGP communication, and MAC broadcast Destination Address. In this case, the MAC layer header contains a random number within the sequence number field. The frame further contains unique 4 bytes source identifier of the resource-restricted device and a sequence number.

Step 2: All devices with proxy capabilities situated in the network in the radio range of the resource-restricted device identify the frame as being sent by a resource-restricted device and each of them checks whether the resource-restricted device is already known to it. This checking is performed by first deriving a proxy maintenance group identifier by applying a known function to the source identifier, and then by searching for the group identifier in a table, either the nwkGroupIDTable or the apsGroupTable.

Step 3: each proxy that can not find the groupID derived from the source identifer of the resource-restricted device in an appropriate table, each proxy adds itself to the group by including the PGroupID in a table. Inclusion into nwkGroupIDTable enables usage of NWK layer member-mode multicast; inclusion into apsGroupTable enables usage of application layer multicast a.k.a. groupcast.

Step 4: each proxy which just became member of this PGroupID, i.e. which does not yet have the information about the destination(s), waits for commissioning to be performed locally on the proxy or else for the binding information to be distributed in the PGroupID (or alternatively via network-wide broadcast) by the proxy with which the binding was performed.

Step 5: each proxy knowing the destination(s) for the resource-restricted device constructs a ZigBee packet to be forwarded to the controlled device(s). The packet is constructed by using the bound device(s) as a unicast destination, network and/or application layer sequence numbers derived from the number supplied by the resource-restricted device in the ZGPD frame, and the alias source address derived from the source identifier of the resource-restricted device, and contains as payload the data or command derived from the application layer payload of the ZGPD frame. Then, each proxy schedules packet forwarding, with a delay as a function of the reception link quality indicator from the ZGPD, knowledge of the route to the destination(s), total path cost to each of the destination(s), and fact of being early to forward in the past.

Step 6: During the timeout, i.e. the time before forwarding the packet, the proxy listens to incoming frames : if the proxy receives an acknowledgment message (either APS ACK or APPL response message) in unicast from the destination, it creates a ZGPD confirmation packet containing SrcID and sequence number corresponding to the received acknowledgment, as well as the short address of the destination which has sent the acknowledgment. Then the proxy forwards it to other proxies in the PGroupID using member mode multicast and using PGroupID as destination address and alias as source address, stops the timer and drops all scheduled transmissions for any packet to any binding destination resulting from the same ZGPD packet (the same ZGPD packet means a packet containing the same source identifier and the same sequence number).

Step 6bis: If the proxy receives the ZGPD confirmation packet in member mode multicast to PGroupID, the proxy forwards it according to member mode multicast rules to the PGroupID, stops the timer and drops all scheduled transmissions for any packet to any binding destination resulting from the same ZGPD packet.

Step 6ter: if the proxy receives the same ZigBee packet (i.e. derived from the same ZGPD frame and using the same destination and source aliasing information), which is unlikely, because it requires special receiving methods, such as promiscuous mode, the proxy stops the timer and drops all scheduled transmissions for any packet to any binding destination resulting from the same ZGPD packet.

Step 7: After the timeout, the proxy sends the packet constructed as described above to the bound destination(s) and schedules retransmissions after the acknowledgment timeout.

Step 8: One or several destination device(s) receive the ZigBee packet. If the alias source address is new, the destination devices discover the reoute to the alias. Otherwise, and following the route discovery, the destination devices construct an acknowledgment packet and unicast it to the alias.

Step 9: During the acknowledgment timeout, if the proxy receives an acknowledgment packet in unicast from a destination device, then the proxy creates a ZGPD confirmation packet containing the source identifier and a sequence number corresponding to the received acknowledgment, as well as the short address of the destination that forwarded the APS ACK; then it forwards it to other destinations in the PGroupID, using multicast member mode and using PGroupID as destination address and alias as source address; and drops the scheduled re-transmissions of this packet, resulting from the same ZGPD frame to this binding destination Step 9bis : If the proxy receives the a ZGPD confirmation packet in member mode on PGroupID, the proxy forwards it according to member mode multicast rules to the PGroupID and drops the scheduled re-transmissions for this packet to this binding destination resulting from the same SrcID and sequence number.

Step 10: If any proxy keeps seeing ZGPD packets, but does not receive acknowledgements from the destination(s), neither direct APS ACKs or APPL response commands, or indirectly via confirmation packets forwarded to the PGroupID, it should re-discover the route to the destination, so that the reverse route is also re-established—or the destination is discovered to be non-existent.

A third procedure will now be described, wherein the destination devices are assumed to have proxy capabilities. In such a case, the ZGPD frame, or a special notification frame derived from it can be forwarded all the way to the destinations. This allows the destination(s) to perform level duplicate filtering at proxy-endpoint level, without the need for the forwarding proxies to use special aliasing procedures, special multicast source address modes, or without the need for the complicated and bandwidth-consuming master proxy election procedure. The mentioned means may still be used, if minimizing the traffic to the destination(s) is desirable. Furthermore, binding information handling can still be simplified on the proxies. Broadcast communication can be used, because the proxy-capable destination is able to filter on the endpoint level, based on the packet content. Analogously, non-unique CGroupIDs, e.g. resulting from deriving a 2-bytes GroupID from a 4-bytes SrcID, can be used, because the destinations will be able to filter the packets, based on their content.

Thus, an exemplary procedure according to this third method can contain the following steps:

When receiving a packet from a previously unknown resource-restricted device, the proxies derive the CGroupID from the resource-restricted device's SrcID, and add themselves as group members. Each proxy constructs a notification packet, being ZigBee packet and containing the relevant fields of the ZGPD frame as a payload. When forwarding a packet to the destination on behalf of this resource-restricted device, the proxies use the derived CGroupID as NWK layer or APS layer destination address and use their individual source address and source sequence number.

If acknowledgements are required, upon receipt of such a notification packet, the proxy endpoint unicasts a notification response message back to the proxy having forwarded the notification. The proxy can then distribute the notification response among other proxies, by sending to PGroupID, so that other proxies can drop all scheduled transmissions and re-transmissions of the resource-restricted packet with the corresponding sequence number.

A fourth procedure will now be described, where source multicast group is used. As mentioned previously, in some cases it is required to receive an acknowledgment to the message derived from the ZGPD frame. However, in the case of multicast destination addressing, sending acknowledgment messages is not trivial, especially when multiple proxies forward independently to the destination(s). If address aliasing is used for source address determination by the proxies, the proxies are required to implement special procedures to respond to communication addressed both to their individual short address and to the alias. Still, many proxy devices may act on behalf of the same resource-restricted device, thus leading to multiple potential destinations for the APS ACK, resulting in potential address conflict perception by the destination, when it tries to map the alias to an IEEE address or discover the route to any of the proxies using the alias; unless aliasing is used also for IEEE address, and/or in need for route re-discovery when the proxy that previously had shortest reverse path to the destination(s) or the master proxy disappears, e.g. is removed from the network or switched off), and/or in unnecessary transmissions by the proxies, due to the inability to observe or filter the same packet forwarded by different proxies.

If no aliasing is used by the proxies for source addressing, the destination that does not have proxy capabilities is unable to filter out duplicates. Furthermore, sending APS ACKs to multicast-addressed frames is strictly speaking not supported in the current ZigBee protocol.

Thus, it is herein proposed to extend ZigBee addressing modes to include GroupIDs as source addresses. This source GroupID (SGroupID) could be generated using a function of resource-restricted device's address: SGroupID=f3(SrcID), identical to or different than f1 and f2 described above.

One possibility to accommodate that in ZigBee is to include the SGroupID in the Source Address field of the network layer header, indicate that it is a group address by using one of the now reserved values in the Multicast Mode sub-field of the Multicast Control Field of the network layer header of a data frame (all frame/field formats below as defined by ZigBee specification release r17), no allow for network-layer multicast source addressing.

Another possibility is to accommodate that in the APS layer, using the APS header Group Address field in combination with the reserved value of the Delivery Mode subfield of the Frame Control field of the APS header, so that the destination can respond with APS level multicast, rather than NWK level multicast.

It will allow the controlled devices to respond with an acknowledgment (APS ACK or APPL response frame) even to multicast-destined packets, without address conflicts, without the proxies having to support the special aliasing, without the need of keeping data on changing master proxies, or frequent route re-discovery, or the problem of guaranteeing to address all of the potentially multiple forwarding devices.

Thus, and exemplary procedure according to this third method contains the following steps. When receiving a packet from a previously unknown resource-restricted device, the proxies add themselves as group members for the SGroupID derived from the resource-restricted device's SrcID; then, when forwarding a packet to the destination on behalf of this resource-restricted device, the proxies use this SGroupID as NWK layer source address and a source sequence number derived from the sequence number included in the resource-restricted frame, and further using CGroupID as the destination address on either network or APS level. Note that the proxies here are not members of the group CGroupID themselves. The CGroupID is preferably derived from the source identifier of the resource-restricted device, as described before, or can be configured and distributed among the proxies.

Upon receipt of such a packet with group source address, in non-member mode multicast, the destination forwards it to other destinations in the CGroupID, changing multicast mode to member mode and using CGroupID as destination address and SGroupID as source address and sends an acknowledgement to that SGroupID using non-member-mode multicast, with the CGroupID in the source address field. Upon receipt of such a packet with group source address, in member mode multicast, the destination forwards it according to member mode multicast rules.

Upon receipt of the multicast-targeted acknowledgement packet, in non-member mode multicast, the proxy forwards it to other destinations in the SGroupID, changing multicast mode to member mode and using SGroupID as destination address and CGroupID as source address. Upon receipt of the multicast-targeted acknowledgement packet, in member mode, the proxy forwards it according to member-mode multicast rules and drop all scheduled transmissions and re-transmissions of the resource-restricted packet with the corresponding sequence number.

It can happen that the proxies in the group SGroupID keep seeing and forwarding the ZGPD packets, but do not receive the acknowledgement from the destination anymore, neither directly or via the SGroupID-addressed multicast. This can indicate, that either the destination disappeared from the network (or moved), or that the reverse path to the SGroupID is broken, or that the previous entry point into the group SGroupID, i.e. the proxy with the best reverse cost to the destination disappeared. Then, the remaining proxies should force the destination to re-discover the reverse path to the group. This can be achieved by a proxy starting route discovery for the destination, with the SGroupID as the source, if the nwkSymLink parameter of the NIB is set to TRUE, as is the case for ZigBee PRO stack profile, or e.g. sending a maintenance command, such as Network Status Command, to the destination.

As can be seen from the above-description of several procedures, different combination of destination addressing schemes, source addressing schemes, and PGroupID and CGroup ID membership, as well as proxy capability at the destination(s) can be used. These combinations and the resulting solution properties and features are summarized in the table below:

| Proxy: NWK layer membership in CGroupID | Proxy EP: APS (EP) membership in CGroupID | NWK layer source addr mode | Proxy-capabilities at the destination | (M) Duplicate filtering at the destination | (M) APS ACK or APPL layer response by destination | (O) Duplicate multicast forwarding filtering the proxy | (O) Proxy keepalive | Reaching all ZDs |
|---|---|---|---|---|---|---|---|---|
| Yes | Yes | individual | not required and not utilized | no | no | limited on Ep level | Yes; EP-level; all proxies | One local ZD cloud (Member-mode) |
| Yes | No | individual | | no | no | No | No | One local ZD cloud (Member-mode) |
| No | yes | individual | | no | no | limited, Ep leve, all proxies | YES; EP-level all proxies | ALL (depending on bcast range) |
| No | No | individual | | no | no | no | No | One dense ZD cloud, local or distant (Non-member mode) |
| Yes | yes | Alias | yes | no | EP level, potentially NWK/APS layer | NWK level; neighbour proxies only | One local ZD cloud, (member mode) |
| Yes | No | Alias | yes | -"- | Maybe NWK/APS layer | NWK level; neighbour proxies only | One local ZD could (Member-mode) |
| No | yes | Alias | yes | -"- | EP level, Maybe NWK level/APS level | No | All (depending on bcast radius) |
| No | No | Alias | yes | -"- | No | No | One distant ZD cloud (Non-member mode) |
| Yes | yes | Multicast SGroupID | yes | yes | NWK layer | NWK level; neighbour proxies only | One local ZD cloud (Member-mode) |
| Yes | No | Multicast SGroupID | yes | Yes | NWK layer | NWK level; neighbour proxies only | One local ZD cloud (Member-mode) |
| No | yes | Multicast SGroupID | yes | Yes | APS layer | No | All (depending on bcast radius) |
| No | No | Multicast SGroupID | yes | yes | No (EP level in promiscouos mode) | No | One distant ZD cloud (Non-member mode) |
| Unicast | | individual | No | Yes | No | No | All (requires storing bindings) |
| Unicast | | Alias | yes | No | No | No | All (requires storing bindings) |
| Unicast | | Multicast SGroupID | yes | Yes | no | no | yes |

-continued

| Proxy: NWK layer membership in CGroupID | Proxy EP: APS (EP) membership in CGroupID | NWK layer source addr mode | Proxy-capabilities at the destination | (M) Duplicate filtering at the destination | (M) APS ACK or APPL layer response by destination | (O) Duplicate multicast forwarding filtering the proxy | (O) Proxy keepalive | Reaching all ZDs |
|---|---|---|---|---|---|---|---|---|
| Broadcast Yes | yes | any Individual | Required, and utilized | Not possible at all Yes (proxyEP-level; lower-level filtering possible with aliasing/ SGroupID source addressing) | Yes (can be distributed to other proxies, using PGroupID) | Yes (ProxyEP-level; lower-level filtering possible with aliasing/ SGroupID source addressing) | Yes | One local ZD cloud (Member-mode) |
| Yes | No | Individual | | Yes (proxyEP-level; lower-level filtering possible with aliasing/ SGroupID source addressing) | Yes (can be distributed to other proxies, using PGroupID) | Yes (ProxyEP-level; lower-level filtering possible with aliasing/ SGroupID source addressing) | Yes | One local ZD cloud (Member-mode) |
| No | yes | Individual | | Yes (proxyEP-level; lower-level filtering possible with aliasing/ SGroupID source addressing) | Yes (can be distributed to other proxies, using PGroupID) | Yes (ProxyEP-level; lower-level filtering possible with aliasing/ SGroupID source addressing) | Yes | ALL (depending on bcast range) |
| No | No | Individual | | Yes (proxyEP-level; lower-level filtering possible with aliasing/ SGroupID source addressing) | Yes (can be distributed to other proxies, using PGroupID) | Yes (ProxyEP-level; lower-level filtering possible with aliasing/ SGroupID source addressing) | Yes | One danse ZD cloud, local or distant (Non-member mode) |
| Unicast | | Individual | | Yes (proxyEP-level; lower-level filtering possible with aliasing/ SGroupID source addressing) | Yes (can be distributed to other proxies, using PGroupID) | NO | No | yes |
| Broadcast | | Individual | | Yes (proxyEP-level; lower-level filtering possible with aliasing/ SGroupID source addressing) | Yes (can be distributed to other proxies, using PGroupID) | Yes (proxyEP-level; lower-level filtering possible with aliasing/SGroupID source addressing) | yes | Yes |

The proper choice of the multicast communication flavour and thus also group membership in the proxies is the key, depending on the options.

A method according to the invention can be implemented into different procedures, some of them being above-described for illustrating purpose.

The present invention is more especially dedicated to be used in any wireless network using resource-restricted devices, such as lighting control networks, building automation and home automation networks.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of wireless communications and which may be used instead of or in addition to features already described herein.

The invention claimed is:

1. A method for wireless communication in a network comprising a resource-restricted device (ZGPD), at least two proxy devices (ZP1, ZP2) and at least one destination device (DD), wherein the method comprises the following steps:
   the resource-restricted device transmitting a frame to be forwarded to a destination device of the at least one destination device in the network, said frame containing a unique source identifier of the resource-restricted device,
   at least one proxy device, of the at least two proxy devices, receiving the frame and identifying the frame as originating from the resource-restricted device,
   the at least one proxy device determining the unique source identifier and deriving a group identifier as a known function of the unique source identifier, the group identifier designating a group source address for a group of the at least two proxy devices in the network,
   the at least one proxy device constructing, from the frame, an appropriate packet to be forwarded by using the derived group identifier as the source address in the packet, and
   the at least one proxy device forwarding the packet by taking into account the group identifier.

2. A method according to claim 1, said group being proxy devices involved in forwarding the frame on behalf of the resource-restricted device, wherein the packet constructed from the frame is a notification packet for a master proxy device of said group, further comprising the steps of:
   if the at least one proxy device was not yet a member of the group identified by the derived group identifier: the at least one proxy device starting a master proxy resolution procedure for determining the master proxy device, by sending a message to the group identified by said group identifier, and the at least one proxy device becoming a member of the group identified by said group identifier,
   if a master proxy resolution procedure is performed: the determined master proxy device receiving information on the at least one destination device,
   the master proxy device constructing, from the frame or the notification packet, a second packet to be forwarded to the at least one destination device, and determining a destination addressing mode, and
   the master proxy forwarding the second packet by using the determined destination addressing mode.

3. A method according to claim 2, where the notification packet is forwarded in unicast to an address of the master proxy device.

4. A method according to claim 2, where the notification packet is forwarded in multicast to the group source address.

5. A method according to claim 1, wherein the at least one destination device is a group of destination devices and wherein the derived group identifier designates the group of destination devices for the resource-restricted device, comprising the step, if the at least one proxy device was not yet a member of the group of destination devices, of the at least one proxy device becoming a member of the group of destination devices, and wherein the step of constructing the packet further comprises using a sequence number supplied by the resource-restricted device, and wherein the packet constructed from the frame is a data or command packet for the group of destination devices and is forwarded to the group of destination devices in multicast using the derived group identifier as an address for the group of destination devices.

6. A method according to claim 1, wherein the step of constructing the packet to be forwarded is performed by using a sequence number supplied by the resource-restricted device.

7. A method according to claim 6, wherein the at least one destination device is a group of destination devices and wherein the derived group identifier designates the group of destination devices for the resource-restricted device, wherein the destination devices of said group of destination devices have proxy capabilities and wherein the constructed packet is a notification packet for at least one of the destination devices of said group of destination devices and is forwarded to the group of destination devices in multicast using the derived group identifier as an address for the group of destination devices.

8. A method according to claim 6, further comprising the step of the at least one of the destination devices receiving the packet and sending an acknowledgement frame to the group source address contained in the received packet, using non-member multicast mode.

9. A method according to claim 8, further comprising the step of a first proxy device that is a member of the group of the at least two proxy devices receiving an acknowledgement in non-member mode, forwarding the acknowledgement in member-mode to the group of the at least two proxy devices and dropping a scheduled re-forwarding of the packet corresponding to the acknowledgement, and second proxy device receiving the acknowledgement in the member-mode multicast and dropping a scheduled forwarding of the packet corresponding to this acknowledgement.

10. A method according to claim 1, further comprising the step of scheduling, by the at least one proxy device, the packet forwarding after a predetermined delay.

11. A method as recited in claim 10, wherein the delay is determined based on at least one of the following criteria: a link quality indicator of the resource-restricted device's frame, a reception success rate of the resource-restricted device's frame, a memory availability, a fact of being early to forward previously a knowledge of the at least one destination device, the knowledge of a route to the at least one destination device, or a path cost of the route to the at least one destination device.

12. A method as recited in claim 10 comprising the step of monitoring, by said at least one proxy device, during a countdown of the predetermined delay, whether a message corresponding to the frame is being transmitted by other devices of the network, and if so, of forwarding, by said at least one proxy device, this message and cancelling a scheduled transmission of said at least one proxy device.

13. A method as recited in claim 1, wherein the method further comprises:
   receiving, at a first proxy device that is a member of said group, an acknowledgement, in non-member mode, from the destination device of the at least one destination device that received the packet, and
   forwarding, by said first proxy device, the acknowledgement, in member mode, to at least one other proxy device in said group.

* * * * *